US008144326B2

(12) United States Patent
Batchelor et al.

(10) Patent No.: US 8,144,326 B2
(45) Date of Patent: Mar. 27, 2012

(54) FABRIC WHITENESS GUIDE

(75) Inventors: Stephen Norman Batchelor, Wirral (GB); Sara Louise Mawhinney, Doreen (AU); Douglas Mesquita Rocha, Wirral (GB); Carol Wendy Ward, Wirral (GB)

(73) Assignee: Conopco, Inc., Englewood Cliffs, NJ (US)

( * ) Notice: Subject to any disclaimer, the term of this patent is extended or adjusted under 35 U.S.C. 154(b) by 382 days.

(21) Appl. No.: 12/438,244

(22) PCT Filed: Nov. 7, 2007

(86) PCT No.: PCT/EP2007/061972
§ 371 (c)(1), (2), (4) Date: Jun. 29, 2009

(87) PCT Pub. No.: WO2008/064977
PCT Pub. Date: Jun. 5, 2008

(65) Prior Publication Data

US 2010/0006463 A1 Jan. 14, 2010

(30) Foreign Application Priority Data

Dec. 1, 2006 (EP) .................................... 06125222

(51) Int. Cl.
*G01J 3/52* (2006.01)

(52) U.S. Cl. .................................... 356/421; 206/459.5

(58) Field of Classification Search .......... 356/421–423; 206/459.5
See application file for complete search history.

(56) References Cited

U.S. PATENT DOCUMENTS

| | | | | |
|---|---|---|---|---|
| 3,799,668 | A * | 3/1974 | McVeigh | 356/421 |
| 3,936,498 | A * | 2/1976 | Bruson et al. | 510/477 |
| 4,657,399 | A * | 4/1987 | Hall | 356/421 |
| 5,685,712 | A * | 11/1997 | Fischer | 433/26 |
| 6,112,665 | A * | 9/2000 | Teter et al. | 356/421 |
| 2002/0140936 | A1* | 10/2002 | De Rigal et al. | 356/422 |
| 2005/0059571 | A1 | 3/2005 | Mahdessian | |
| 2006/0123556 | A1 | 6/2006 | Caswell et al. | |

FOREIGN PATENT DOCUMENTS

| | | | |
|---|---|---|---|
| EP | 1 516 918 | A2 | 3/2005 |
| WO | 01/32097 | A1 | 5/2001 |

OTHER PUBLICATIONS

International Search Report PCT/EP2007/061972, Feb. 2008.

* cited by examiner

*Primary Examiner* — Kara E Geisel
(74) *Attorney, Agent, or Firm* — Milton L. Honig

(57) ABSTRACT

A fabric whiteness guide comprising at least one visual scale of whiteness.

17 Claims, 2 Drawing Sheets

FABRIC WHITENESS GUIDE

The present invention concerns a fabric whiteness guide for monitoring whiteness of a fabric.

In many circumstances, whiteness is extremely valuable to consumers. Indeed, for some garments (e.g. expensive white suit shirts, uniforms) off-whites are perceived as unacceptable. In these cases, reduced whiteness may even result in the garment being discarded by the consumer. Repeated wash-wear cycles can reduce the whiteness of a garment.

The ability of washing powders to maintain/rejuvenate whiteness may be increased by the use of shading dyes.

An objective is to provide a device and method for in-home consumer monitoring of the changes in whiteness of fabric and evaluation of the whiteness benefits of a laundry composition.

Accordingly, in a first aspect, the present invention provides a fabric whiteness guide comprising at least one visual scale of whiteness.

The fabric whiteness guide allows in-home consumer monitoring of the change in whiteness of a fabric by matching the shade of the fabric with the whiteness shade displayed visually on the scale, without the need for complicated equipment or training.

The scale(s) may display a whiteness range varying progressively from low whiteness at one end of the scale to high whiteness at the other end of the scale.

A whiteness scale(s) may be defined in terms of L*a*b* values (the CIE LAB colour space, (CIE 1976 L* a* b*), where L* is the lightness value, a* is the red-green value and b* is the yellow-blue value.

The variation in whiteness on the scale, may be due to a combination of a change in lightness (L*) and colouration (a* and/or b*).

The highest whiteness may be defined as $L^*_{max}$, $a^*_{max}$, $b^*_{max}$ (UV-included) such that:

$L^*_{max}$ is in the range 85-100, preferably 91-98

$a^*_{max}$ is in the range −3 to +5, preferably −0.5 to +1.5

$b^*_{max}$ is in the range +5 to −15, preferably −2 to −12.

and the minimum whiteness values as $L^*_{min}$, $a^*_{min}$, $b^*_{min}$ such that $$\Delta L^* = L^*_{max} - L^*_{min},$$

where ΔL* is 3 to 20 units preferably 5 to 10 units, reflecting a greying of the cloth $$\Delta a^* = a^*_{max} - a^*_{min},$$

where

Δa* is +/−0 to 5 units, preferably +/−0 to 2 units $\Delta b^* = b^*_{max} - b^*_{min}$, where Δb* is −3 to −20 units preferably −5 to −12 units, reflecting a change in yellowness of the cloth.

The a* values may be constant or at least within +/−1 unit, to restrict the scale to focus on blue-yellow colouration rather than red-green.

The intervening whiteness values may be between the above extremes. The intervening whiteness values may be equally distributed. Alternatively, the L* and b* and a* values may be lowered in alternate steps.

The scale(s) may be configured for monitoring changes in whiteness due to an increase or decrease in one particular colour (e.g. yellow). Accordingly, the b* values may vary in either the positive or negative with the a* values and/or L* values maintained constant or constant at least within +/−1 unit.

The scale may be configured for monitoring changes in whiteness due only to the change in lightness ('greyness') of a fabric. Accordingly, the L* values may be varied and the a* values and b* values maintained constant to within +/−1 unit. The a* may be maintained at zero or at least close to zero (within +/−1.0 and preferably within +/−0.3 of zero). The b* values may be maintained constant at a value (to within +/−1 unit) which is less than 2 and preferably less than −3 units.

The absolute b* values may raised above the level of the a* values due to the incorporation of fluorescers which improve the perceived appearance of the whiteness guide itself.

There may be multiple scales each showing different changes in one or more in different colours and lightness, so the consumer can select the appropriate scale according to the a particular colouration/greyness of the white fabric to undergo the measuring. In this way the consumer can identify and appreciate the cause of a decrease in whiteness, by matching the fabric with the correct scale.

The whiteness scale may be continuous (where whiteness increases gradually) across the scale or it may be stepped. In the case of a stepped scale, this will comprise a plurality of discrete portions, wherein the progression from one portion of the scale to another portion, involves a step-change in whiteness.

In the case of a stepped scale the total colour difference between adjacent shades is preferably such that the shade of one portion of the scale is easily and quickly distinguished by the naked eye from the shade of an adjacent portion. This means that quick, in-home testing can be done by the busy consumer, without the need for laboratory conditions or equipment. However, at the same time it is preferred that the scale is focussed on subtle changes in whiteness within a restricted range of high whiteness values.

Accordingly, the difference in whiteness between adjacent portions may be defined such that the colour of each portion has Lab values: $L^*_n$, $a^*_n$, $b^*_n$, defined by $$L^*_n = L^*_{max} - \frac{(n-1)}{(N-1)}\Delta L^*$$

$$a^*_n = a^*_{max} - \frac{(n-1)}{(N-1)}\Delta a^*$$

$$b^*_n = b^*_{max} - \frac{(n-1)}{(N-1)}\Delta b^*$$

where the highest whiteness has n=1, there are N discrete shades of whites in the scale and the shades decrease in whiteness in equal steps (+/−0.3 units) along the 3 axes.

Preferably, the total colour difference represented as the ΔE value (corresponding to the positive square root of $[(L^*_n - L^*_{n-1})^2 + (a^*_n - a^*_{n-1})^2 + (b^*_n - b^*_{n-1})^2]$ is preferably greater than or equal to 0.5, and more preferably 0.5 to 2.0, (UV-included).

The values of L* and b* may vary alternately on the scale, such L* only changes when n is an even number and b* when n is an odd number.

The values of L* and b* may vary alternately on the scale, such b* only changes when n is an even number and L* when n is an odd number.

The L* value may decrease linearly whereas the b* values decrease for even values of n.

The b* value may decrease linearly with each value of n, whereas the L* values are only decreased for even values of n.

The portions may have a uniform shade of white. A uniformly shaded portion is easier for the consumer to match with the fabric.

By "continuous", it is meant that the change in whiteness appears (to the naked eye) continuous along the scale or scales. A continuous scale(s) may however, include demarcation by visual indicia e.g. lines, so as to divide up the scale into multiple portions. This makes it easier for the consumer to remember, without recording, roughly where the whiteness of the fabric falls on the scale.

The scale or scales may be labelled with directional visual indicia to direct the user to hold the product in a predetermined orientation. The higher whiteness values may be on one side i.e., the right or left of the user (when facing the product).

The portions of the scale or scales may be labelled with numbers, names, logos etc. applied by e.g. printing to ease monitoring.

The portions of the scale or scales may be arranged in a single, straight row. Alternatively, the portions may be arranged in multiple rows. The row or rows may be straight or curved.

Preferably the portions are of equal size and shape. This is advantageous in that no portion/s is/are given undue preference due to size. This affords more accurate comparison between the whiteness of the portions and the fabric based on whiteness.

The portions may be 0.5 to 4 cm, and may be greater than 2 cm in length/diameter. By length/diameter it is meant the greatest length/diameter of a shape e.g. this will be the diameter of a circle, the greater diameter of an ellipse, the length of a side of a square, and the length of the longer side of a rectangle.

The whiteness scale is preferably a rectangle and is preferably 1-4 cm, and may be greater than 2 cm by 10-12 cm.

The guide may comprise apertures corresponding with the scale, whereby the fabric can be viewed through the apertures to identify the level of whiteness according to the scale.

If the guide includes apertures, it is preferred that the length or diameter of the portions are at least 1.3 times, more preferably two times the length or diameter of the apertures. Preferably the portions are at least 1 cm in diameter and more preferably at least 3 cm. This allows a large area of the guide to surround the aperture for matching with the fabric to be tested.

The apertures may correspond with the portions, and there may be one aperture per portion. Alternatively there may be more than one aperture per portion so that the whiteness of the fabric is viewed through multiple apertures, which may be in a pattern or grid. The aperture or apertures may be entirely enclosed within the perimeter of each portion.

Alternatively or additionally, one or more of the apertures may be in the form of a shape which is cut into the perimeter of the portion i.e. so that it is not enclosed by the perimeter, but itself forms part of the perimeter.

The aperture may have a curved perimeter. It may be circular or elliptical. A curved perimeter is advantageous as it can make judging the shade easier for the human eye.

The aperture may have an undulating perimeter, and the undulations may be such that the shape has multiple (2-dimensional) protrusions.

Alternatively the shape may be angular, such as star shaped.

Visually interesting shapes such as undulating and star shapes provide visual stimulae for the consumer, to attract the consumer to do the testing and also providing visual stimulae during testing.

The whiteness scale may have 3-20 portions, preferably 8-14 portions. A more complicated scale offers greater accuracy however excessively complicated scales will put off many consumers. Surprisingly a very simple scale increases the frequency of use of the device for first time users, and monitoring becomes more habitual. There may be a choice of scales, a first scale having 3-20 portions and at least one other scale having a lower number, such as half, than the first scale.

The scale may have less than 10 portions. This is advantageous for whiteness guides focussed on a restricted range of whiteness, as described above. This is the optimum range which provides portions which are easily visually distinguished by the consumer.

The guide may be a planar member. By planar, it is meant less that 2 mm thick, preferably less than 1 mm. This has the advantage that the surface carrying the scale is not distanced (by thickness) from the fabric substrate during measuring, which allows for more accurate comparisons.

Preferably the guide is sufficiently flexible so it can flex to lie against a flexible substrate such as fabric. This has the advantage that the guide can be easily flexed to conform to the shape of a garment to carry out the whiteness comparison.

The whiteness guide may be provided with the packaging, unattached and loose inside. This has the advantage that the guide is quickly obtained on opening the package. The whiteness guide may be wrapped in packaging to protect it from the washing composition, so that when it is initially retrieved from the pack and used, it is not contaminated with the washing composition which could then transfer on to the fabric during whiteness measuring.

Alternatively the guide may be integral with the packaging, e.g. printed on the side of the pack. This reduces packaging material, prevents the guide being accidentally lost and also the consumer is reminded to use the guide each time they dose from the pack.

In a second aspect, the invention provides a method of consumer-measuring of the whiteness of a fabric, the method including the step of comparing the fabric with a scale of whiteness of the first aspect of the invention including any optional, advantageous features as described above.

The step of comparing may take place after washing with a laundry composition. Alternatively or additionally, it may also take place before washing. This allows the consumer to evaluate the efficacy of the washing process to improve whiteness. The step of comparing may take place before and/or after consecutive washes, for evaluation of the progressive improvement in whiteness of a particular washing composition. The guide can confirm the maintenance of whiteness due to a particular washing composition.

The invention also allows the consumer to compare the different washing compositions or brands of compositions or other conditions such as temperature of the wash. The step of comparing may take place after other events which affect washing, for instance drying of washed fabrics outside, in sunlight etc.

In a third aspect, the invention provides a package containing a laundry composition in combination with a fabric whiteness guide of the first aspect, including any optional advantageous features as described above, and preferably together with instructions for use of said fabric whiteness guide to measure the whiteness of a fabric according to the method of the second aspect including any optional, advantageous features as described above.

The provision of a whiteness guide together with the washing powder enables the consumer to effectively monitor the effectiveness of the powder and appreciate the benefit of whiteness agents added to the washing powder. Thus the consumer is given more control over the evaluation of different products and different washing and also drying conditions.

The guide may be perfumed, and the perfume of the guide may be the same as or correspond with the perfume of the laundry composition.

The detergent powder may contain an agent for improving or maintaining whiteness. The agent may comprise one or more dyes for increasing perceived whiteness.

Preferably the dye, or dyes together, has/have a peak absorption wavelength on the substrate fabric of 540 nm to 650 nm, and further preferably from 570 nm to 630 nm.

Dyes that are substantive to fabrics may be used. The dyes may be a direct dye so as to be substantive to cotton or they may be disperse and solvent dyes which are substantive to synthetic fibres e.g., polyester and nylon. The composition may contain a mixture of dye so as to be substantive to both fibres.

The laundry composition may contain predominately anionic surfactants. In this case dyes containing acid groups are preferred. For use in products which contain predominantly cationic surfactants, dyes containing basic groups are preferred. This is to prevent precipitation between the dye and surfactant.

Suitable dyes for use in products containing predominately anionic surfactants include those listed in the Colour Index as Direct Violet Dyes Direct Blue dyes, Acid Blue and Acid Violet dyes.

Dyes which may be metabolised to carcinogenic amines should not be used. For example dyes which when reduced release benzidene, 3,3'-dimethoxybenzidene, 3,3'-dimethybenzidene or 3,3'-dichlorobenzidene should not be used.

The laundry composition may contain predominately cationic surfactants. Suitable dyes here include those listed in the Colour Index as Basic Blue and Basic Violet Dyes.

The dyes may comprise one or more hydrophobic dyes selected from benzodifuranes, methine, triphenylmethanes, napthalimides, pyrazole, napthoquinone, anthraquinone and mono-azo or di-azo dyes. Hydrophobic dyes are dyes which do not contain any charged water solubilising group. Hydrophobic dyes may be selected from the groups of disperse and solvent dyes. Blue and violet anthraquinone and mono-azo dye are preferred.

Preferred dyes include solvent violet 13, disperse violet 27 disperse violet 26, disperse violet 28, disperse violet 63 and disperse violet 77

The shading dye(s) may be a direct violet dye. These are particularly useful for cotton containing fabrics Preferred are dyes are selected from the group comprising bis-azo direct violet dyes of the formula:

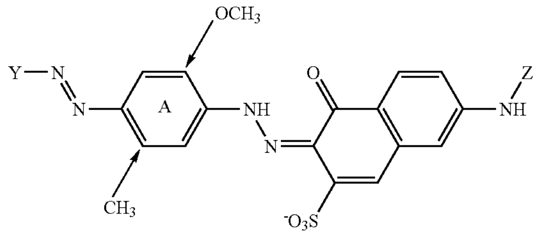

where Z is H or phenyl, the A ring is preferably substituted by a methyl and methoxy group at the positions indicated by arrows, the A ring may also be a naphthyl ring, the Y group is a phenyl or naphthyl ring, which may be substituted by sulphonate groups and may be mono or disubstituted by methyl groups.

The shading dye(s) may comprise the dyes direct violet 7, direct violet 9, direct violet 11, direct violet 26, direct violet 31, direct violet 35, direct violet 40, direct violet 41, direct violet 51, and direct violet 99.

Cu containing direct dyes such as direct violet 66 may also be used.

The shading dye(s) may comprise acid dyes for shading cotton and may be selected from acid blue 98, acid violet 17, acid violet 50, acid black 1, acid red 51, acid red 17 acid blue 29. One preferred acid shading dye is acid blue 98.

The shading dye may comprise a photobleach covalently linked to another blue or violet chromophore.

The shading dye may comprise a reactive dye covalently linked to a polymer or a solid particle.

The shading dye may comprise a dye adsorbed onto a solid particle, such as a clay.

For ease of incorporation into laundry products it is preferred if the shading dye is supplied in a liquid form.

The level of dye in the laundry composition may be in the range from 0.000001 wt % to 0.01 wt % preferably in the range from 0.0001 to 0.01, and preferably 0.0002 to 0.005 wt %.

The composition may comprise a fluorescent agent (optical brightener). Fluorescent agents are available commercially. The fluorescent agent may be supplied and used in the form of their alkali metal salts, for example, the sodium salts. The total amount of the fluorescent agent or agents used in the composition may be generally from 0.005 to 2 wt %, preferably 0.01 to 0.1 wt %.

Preferred classes of fluorescer are: Di-styryl biphenyl compounds, e.g. Tinopal (Trade Mark) CBS-X, Di-amine stilbene di-sulphonic acid compounds, e.g. Tinopal DMS pure Xtra and Blankophor (Trade Mark) HRH, and Pyrazoline compounds, e.g. Blankophor SN. Preferred fluorescers are: sodium 2 (4-styryl-3-sulfophenyl)-2H-napthol[1,2-d]trazole, disodium 4,4'-bis{[(4-anilino-6-(N methyl-N-2 hydroxyethyl)amino 1,3,5-triazin-2-yl)]amino}stilbene-2-2' disulfonate, disodium 4,4'-bis{[(4-anilino-6-morpholino-1,3,5-triazin-2-yl)]amino} stilbene-2-2' disulfonate, and disodium 4,4'-bis(2-sulfoslyryl)biphenyl.

The laundry composition and whiteness guide may include a common shading dye or fluorescer, as described above.

The present invention relates to compositions which are used to treat laundry items such as clothes. Such compositions are preferably laundry detergent compositions used for washing (especially particulate detergents, liquid detergents, laundry bars, pastes, gels or tablets), laundry fabric conditioners used for softening fabrics, pre-treatment products, post-treatment products, tumble dryer products, ironing products etc. Preferably they are laundry treatment products which are applied in an aqueous environment.

Various non-limiting embodiments of the invention will now be more particularly described with reference to the following figures in which.

Figure 1:
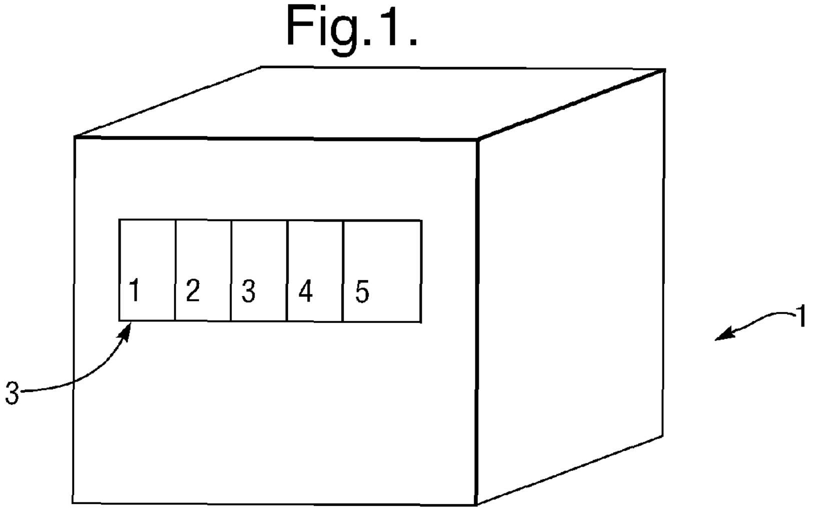
FIG. 1 shows a packaged laundry composition according to embodiments of the invention where the package is a carton.

Referring now to FIG. 1, a paperboard carton 1 is shown, having scale 3 printed thereon.

The container is preferably formed from paperboard or cardboard, but may include layers of metal or plastic materials for barrier purposes, etc.

The scale consists of five 3×3 $cm^2$ square portions, numbered 1, 2, 3, 4, 5 from left to right. The portions have the following LAB values measured using a reflectometer with UV included:

| | L* | a* | b* |
|---|---|---|---|
| 1 | 93.0 | 0.5 | −3 |
| 2 | 92.0 | 0.5 | −2 |
| 3 | 91.0 | 0.5 | −1 |
| 4 | 90.0 | 0.5 | 0 |
| 5 | 89.0 | 0.5 | +1 |

The carton contains granular laundry composition A or B or C or D (as described below).

In a further embodiment, the carton is as described above, except that the scale consists of five 2×2 $cm^2$ square portions. The boxes had the following L*,a*,b* values measured using a reflectometer with UV included:

| | L* | a* | b* |
|---|---|---|---|
| 1 | 95.0 | 0.5 | −6 |
| 2 | 93.0 | 0.5 | −4 |
| 3 | 91.0 | 0.5 | −2 |
| 4 | 89.0 | 0.5 | 0 |
| 5 | 87.0 | 0.5 | +2 |

The carton contains 1 kg of composition A or B or C or D.

Figure 2:
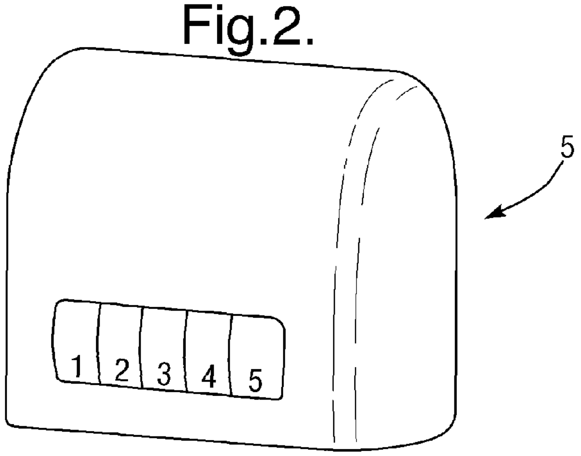
FIG. 2 shows a packaged laundry composition according to embodiments of the invention where the package is a flexible bag.
Figure 3:
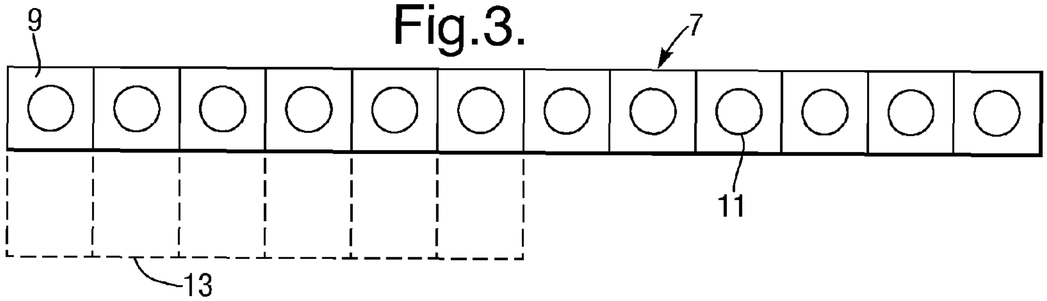
FIG. 3 shows a whiteness guide with apertures according to further embodiments of the invention including a loose or removable whiteness guide.

Referring now to FIG. 2, a flexible plastic bag 5 is shown. The bag 5 has a whiteness scale printed onto the outside. The scale consists of five 2×2 $cm^2$ square portions, numbered 1, 2, 3, 4, 5 from left to right. The portions have the following L*,a*,b* values measured using a reflectometer with UV included:

| | L* | a* | b* |
|---|---|---|---|
| 1 | 90.0 | 0.5 | −4 |
| 2 | 88.0 | 0.5 | −2 |
| 3 | 86.0 | 0.5 | 0 |
| 4 | 84.0 | 0.5 | +2 |
| 5 | 82.0 | 0.5 | +4 |

The pack contains 1 kg of laundry composition A or B or C or D.

A further embodiment comprises the plastic pack as described above in reference to FIG. 2 except that the portions have the following LAB values measured using a reflectometer with UV included:

| | L* | a* | b* |
|---|---|---|---|
| 1 | 90.0 | 0.5 | −4 |
| 2 | 88.0 | 0.5 | −4 |
| 3 | 88.0 | 0.5 | −2 |
| 4 | 86.0 | 0.5 | −2 |
| 5 | 86.0 | 0.5 | 0 |

The pack contains a laundry composition A or B or C or D.

In further embodiments, the above packages are provided with whiteness scales printed onto a cardboard strip. The strip is provided loose within or removable from the package so that it can be retrieved on first opening by the consumer. The portions may be 3×3 cm.

In further embodiments, the above cardboard strip 7 is 20 cm long and 6 cm wide. At the top of the card 7 in a space 2 cm long and the width of the card, a tradename is printed (not shown). The rest of the card is equally divided into boxes of 3×3 cm, so that there are 12 boxes in total. The whiteness of the boxes are as follows:

| | L* | a* | b* |
|---|---|---|---|
| 1 | 92.5 | 0.5 | −7 |
| 2 | 92.0 | 0.5 | −6.2 |
| 3 | 91.5 | 0.5 | −5.4 |
| 4 | 91.0 | 0.5 | −4.6 |
| 5 | 90.5 | 0.5 | −3.8 |
| 6 | 90.0 | 0.5 | −3.0 |
| 7 | 89.5 | 0.5 | −2.2 |
| 8 | 89.0 | 0.5 | −1.4 |
| 9 | 88.5 | 0.5 | −0.6 |
| 10 | 88.0 | 0.5 | +0.2 |
| 11 | 87.5 | 0.5 | +1.0 |
| 12 | 87.0 | 0.5 | +1.8 |

A circular hole 11 of 1 cm radius is cut into the center of each portion.

The circular hole 11 allows the consumer to view the fabric within a window surrounded by an area of the whiteness shade of the scale. The size of the hole 11 relative to the size of the portion is selected so that there is sufficient area of the whiteness shade to enable quick, accurate matching of the fabric with the whiteness shade.

In one embodiment, the portions are arranged in a single row. In a further embodiment, the portions are in two rows (shown at dotted line B).

| Exemplary Laundry Formulations A, B, C, D | | | | |
|---|---|---|---|---|
| Formulation | A | B | C | D |
| NaLAS | 15 | 20 | 10 | 12 |
| NI (7EO) | — | — | — | 8 |
| Na tripolyphosphate | 7 | 15 | — | — |
| Soap | — | — | — | 1 |
| Zeolite A24 | — | — | — | 17 |
| Sodium silicate | 5 | 4 | 5 | 1 |
| Sodium carbonate | 23 | 20 | 30 | 20 |
| Sodium sulphate | 40 | 30 | 40 | 20 |
| Carboxymethylcellulose | 0.2 | 0.3 | — | 0.5 |
| Percarbonate | 2 | 3 | — | 10 |
| TAED | 0.5 | 0.8 | — | 4 |
| Protease | 0.005 | 0.01 | — | 0.005 |
| Amylase | 0.001 | 0.003 | — | — |
| Cellulase | — | 0.003 | — | — |
| Fluorescer | 0.1 | 0.15 | 0.05 | 0.3 |
| Direct Violet 9 | 0.0006 | 0.0008 | | 0.0004 |
| Direct Violet 99 | — | — | 0.0004 | — |
| Solvent Violet 13 | — | 0.02 | 0 | 0.01 |
| Sulfonated Zn Pthalocyanine photobleach | 0.002 | 0.004 | — | — |
| Water/impurities/minors | remainder | remainder | remainder | remainder |

Enzyme levels are given as percent pure enzyme. Levels of direct violet 9, direct violet 99, solvent violet 13 and Sulfonated Zn Pthalocyanine photobleach are given as pure dye. NI(7EO) refers to R—$(OCH_2CH_2)_nOH$, where R is an alkyl chain of C12 to C15, and n is 7.

The formulations are prepared by adding direct violet 9, direct violet 99 and the Sulfonated Zn Pthalocyanine photobleach into the slurry which is then spray dried. Alternatively, the dyes and photobleach may be added via post-dosed $MgSO_4$ granules.

The solvent violet 13 was dissolved in non-ionic surfactant (7E0) and granulated onto zeolite, to give a granule containing 0.2 wt % dye. This was post-dosed to the formulation.

Figure 4:
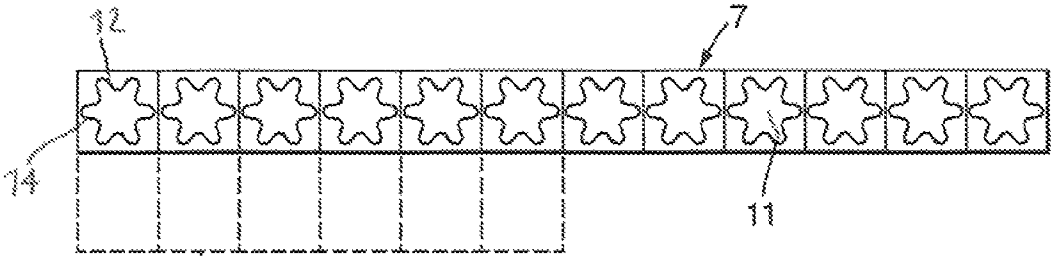
FIG. 4 shows a whiteness guide with apertures each having an undulating perimeter and which has multiple 2-dimensional protrusions.

FIG. 4 reveals the cardboard strip 7 featuring a series of apertures 11 each with an undulating perimeter 12 and a multiplicity of 2-dimensional protrusions 14.

It is of course to be understood that the invention is not intended to be restricted to the details of the above embodiment which are described by way of example only.

The invention claimed is:

1. A package containing a laundry composition in combination with a fabric whiteness guide, the fabric whiteness guide comprising at least one visual scale of whiteness, characterised in that the guide includes apertures corresponding with the scale, said apertures having an undulating perimeter.

2. The package according to claim 1 wherein the whiteness scale has maximum whiteness defined by:

$L^*_{max}$ is the maximum lightness value and is in the range 85-100, $a^*_{max}$ is the maximum red-green value and is in the range −3 to +5, $b^*_{max}$ is the maximum yellow-blue value and is in the range +5 to −15, according to CIE LAB colour space, CIE 1976 L*a*b*.

3. The package according to claim 2 wherein the whiteness scale has a $L^*_{min}$ which is the minimum lightness value, $a^*_{min}$ is the minimum red-green value and, $b^*_{min}$ is the minimum yellow-blue value such that $\Delta L^* = L^*_{max} - L^*_{min}$ where $\Delta L^*$ is 3 to 20 units, $\Delta a^* = a^*_{max} - a^*_{min}$ where $\Delta a^*$ is +/−0 to 5 units, $\Delta b^* = b^*_{max} - b^*_{min}$ where $\Delta b^*$ is −3 to −15 units.

4. The package according to claim 3 wherein a* and b* values are maintained close to zero or constant or constant at least within +/−1 unit, according to CIE LAB colour space, CIE 1976 L*a*b*.

5. The package according to claim 1 comprising a plurality of discrete portions.

6. The package according to claim 5 wherein progression from one portion to another involves a step-change in whiteness.

7. The package according to claim 5 wherein shading within each of the portions is uniformly shaded for the portion.

8. The package according to claim 5 wherein the total colour difference ΔE value corresponding to the positive square root of $[(L^*_n - L^*_{n-1})^2 + (a^*_n - a^*_{n-1})^2 + (b^*_n - b^*_{n-1})^2]$ between adjacent portions is greater than or equal to 0.5, and wherein $L^*_{ns}$ is the lightness value for a first portion, $a^*_n$ is a red-green value for the first portion n, and $b^*_n$ is a yellow-blue value for the first portion n, and n−1 is a second portion adjacent to the first portion n.

9. The package according to claim 5 wherein portions are 0.5 to 4 cm in length or diameter.

10. The package according to claim 5 wherein the apertures correspond with the portions.

11. The package according to claim 5 wherein a length or diameter of the portions are at least 1.3 times a length or diameter of the apertures.

12. A method of consumer-measuring and/or monitoring of the whiteness of a fabric, the method including the step of providing a package containing a laundry composition in combination with a fabric whiteness guide according to claim 1 and comparing the fabric with the scale of whiteness.

13. The package of claim 1 wherein the laundry composition contains an agent for improving or maintaining whiteness.

14. The package of claim 13 wherein the agent for improving or maintaining whiteness comprises one or more dyes for increasing perceived whiteness.

15. The package of claim 14 wherein the dye or dyes together has/have a peak absorption wavelength on the substrate fabric of 540 nm to 650 nm.

16. The package according to claim 13 including instructions for use of said fabric whiteness guide to measure the whiteness of a fabric.

17. The package according to claim 1 characterised in the undulations are such that their shape has multiple 2-dimensional protrusions.

* * * * *